June 4, 1935.   R. S. ALLEN ET AL   2,003,816
CAMP TRAILER
Filed July 17, 1934   4 Sheets-Sheet 1

Witnesses

INVENTORS
Rufus S. Allen
Ben Oakes

June 4, 1935.  R. S. ALLEN ET AL  2,003,816
CAMP TRAILER
Filed July 17, 1934   4 Sheets-Sheet 2

INVENTORS
Rufus S. Allen
Ben Oakes

June 4, 1935. R. S. ALLEN ET AL 2,003,816
CAMP TRAILER
Filed July 17, 1934 4 Sheets-Sheet 3

INVENTORS

June 4, 1935.  R. S. ALLEN ET AL  2,003,816
CAMP TRAILER
Filed July 17, 1934  4 Sheets-Sheet 4
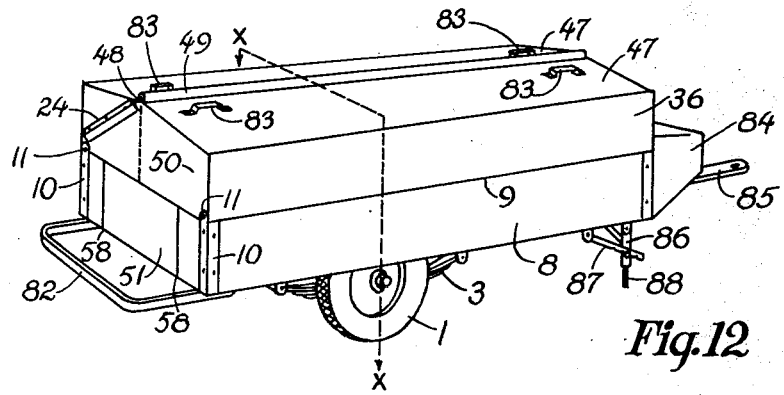
Fig.12
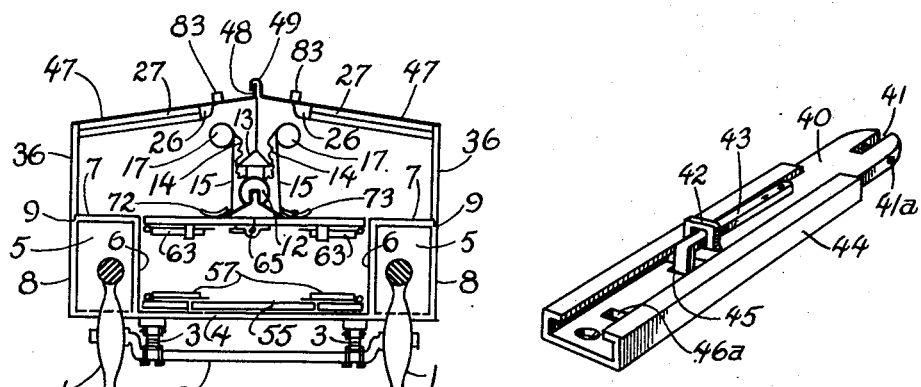
Fig.13
Fig.14

Patented June 4, 1935

2,003,816

UNITED STATES PATENT OFFICE 2,003,816

CAMP TRAILER

Rufus S. Allen and Ben Oakes, Detroit, Mich.

Application July 17, 1934, Serial No. 735,570

7 Claims. (Cl. 296—23)

This invention relates to certain new and useful improvements in trailers for motor vehicles and the like for camping purposes and for commercial hauling also.

An object of this invention is first, to construct a folding or collapsible camp trailer which forms a convenient living and sleeping room in the form of a house tent when opened, built with a combination of new and improved parts in combination with a trailer and having no loose parts to be removed in order to bring the upper "roof unit" housings to a closed position or to an open position and when in a closed position the top of the structure is below the horizontal line of the driver's rear view. Second: to construct housing sections with air spaced walls and an air spaced double roof to ventilate and carry away to the outer air the heat created by the sun rays on the outer top and walls and to prevent dampness on the under side of the canvas roof, these housing sections supported, and swinging on, a rabbeted water tight friction bearing extending from end to end of the trailer and housings. The improved box-like construction of the trailer carries and operates a top section comprising a hollow ventilating ridge pole, a double canvas roof member and automatic spring rollers with shifting hangers. Third: the construction is so assembled that the various sections can be removed and the trailer used for commercial hauling and when folded or closed may be up-ended and stored in a small space when not in use. These and other objects we accomplished by mechanism illustrated in the accompanying drawings.

Fig. 1 shows a trailer with ground wheels, axle and body substantially of the ordinary or conventional type of trailer.

Fig. 2 shows a perspective view of the Fig. 1, with reinforced sides of the body, the floor being extended in width in front and back of the wheels and having bulkheads bolted to floor, sides of box and top shell of the hollow beam and covered with wood or metal forming a hollow beam full length of the body sides to stiffen and make the trailer body rigid for carrying the improved upper structure with space for storage. The housings show thrown to an open position with the roof section lying approximately in a level position, flaps being omitted in this view to make drawing clearer. The end sections folded inside of structure a portion of tail gate or platform is cut away to give a clearer view inside of trailer.

Fig. 3 shows a perspective view of a two part or pair of box like housings which form approximately the upper half of the structure with air spaced ventilating walls. These housings carry a combination of newly designed units which make the walls and roof or top reversible or capable of changing their respective positions. These housings have an extended end portion which forms a part of the lower portion of the gables; they are housings for a double canvas ventilating roof member shown in Fig. 10. The housings swing on a water tight friction rabbeted offset extending full length of the structure with a pivot bolt at each end to keep the friction bearing in alignment.

Fig. 4 shows the folding rear end wall closure unit or section comprising combination platform and tail gate with main door frame forming a portion of gable, a door and window with auxiliary end doors for closing end openings over the hollow beam, a slidable guide pin to contact a groove in a ridge pole, swinging on a water tight friction joint extending full length of the platform with a pivot bolt at each end to keep the friction joint in alignment.

Fig. 9 is left off.

Fig. 12 shows a perspective view of a complete folding trailer in a folded position for travel.

Fig. 13 shows a section on the dotted line X—X Fig. 12.

Figure 1:
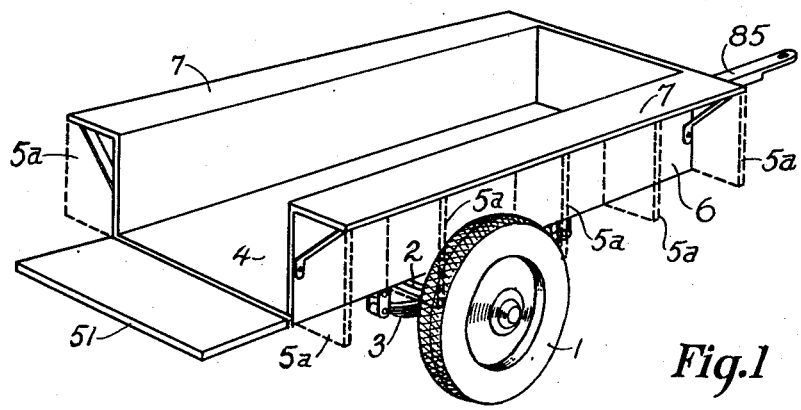
Figure 2:
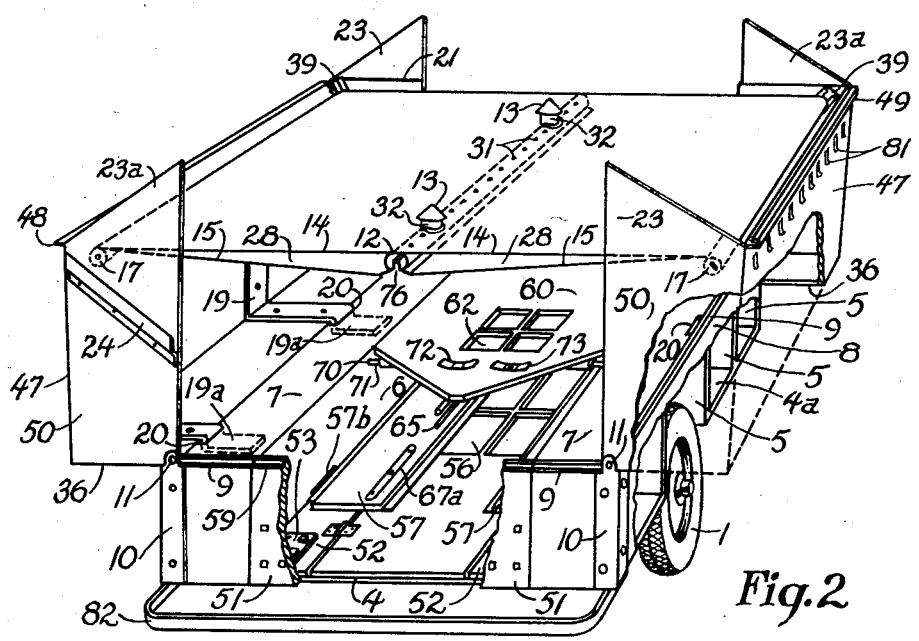

Fig. 14 shows an enlarged detail of the slidable hanger for shifting the automatic rollers and is character 39 in the drawings. Like characters of reference indicate like parts throughout the several views in the drawings. The trailer is carried by ground wheels 1 on the axle 2 with springs 3 which are attached to the under frame work which carries the floor 4. The floor 4 is extended in width in front and back of wheels as shown in Fig. 2 at 4a in order that the sides of trailer body may be reinforced by bulkheads 5 bolted to sides 6 and seat space at 7 and covered with wood or sheet metal 8 forming a hollow beam construction in combination with the trailer floor 4. This hollow beam forms the lower portion of the side wall of the structure, the top of which can be used for seats 7, a rabbet 9 extending around the top outside edge of hollow beam, corner braces 10 are bolted to rear corners of the hollow beam construction, with pivot bearing openings 11. The housings, Fig. 3, carry the roof section Fig. 10, comprising the ridge pole 12 with vent hood outlet caps 13 the double canvas top 14 and 15 with snaps 37 on the flaps 16, and the automatic spring rollers 17, also the slidable hanger Fig. 14, all of which will be described later in the specification. In each of the four corners of Fig. 3, as indicated at 18 is a threaded opening to receive a pivot bolt which passes through opening 11 in corner braces 10, see Fig. 2 and 12, to pivot the hinge bearing in alignment, at each corner, indicated at 11. The housings are of a box like construction with ends 23 and 23a forming a part of the gables when structure is open, having a combination bracket and stop arm 19 and 19a bolted at intervals along the inside, the stop arms 19a are adapted to slip through slots 20, Fig. 2, and hang vertical when the housing is in a closed position and when housing is in an open position these ends 19a come in contact with the underside of the top shell of the hollow beam or seat 7, as shown by the dotted lines in Fig. 2, thus forming a stop to prevent the housings from opening past a ninety degree movement from a closed position. One end section 50 on each housing has a pocket 21 extending in wall to dotted line 22, Fig. 3 this pocket 21 is to receive the extended end 23a which forms a part of the end gable for roof, the end 23a folds into pocket 21 while end 23 laps over on outside of the ends 50. A water proof strip 24 is offset to pass over the end 23 when housing section is closed, see Fig. 12.

Figure 3:
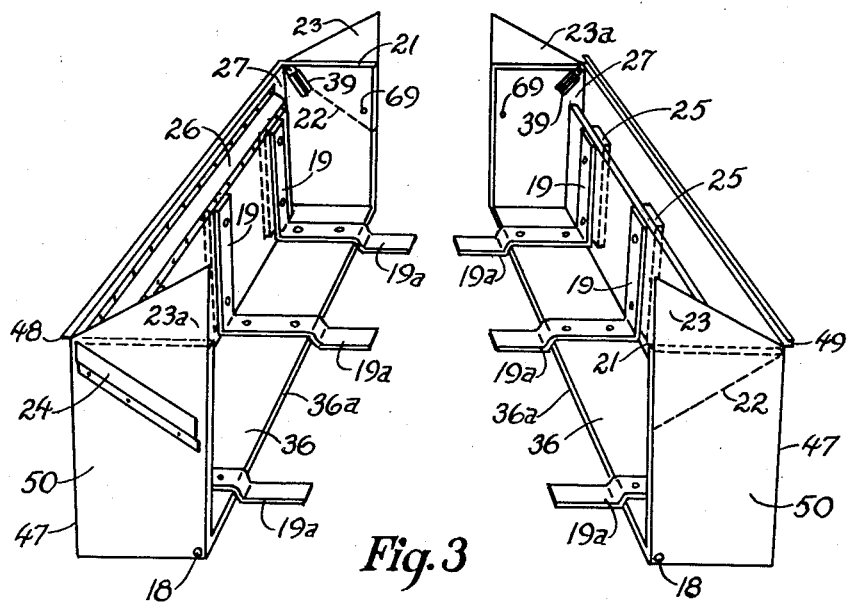
Figure 10:
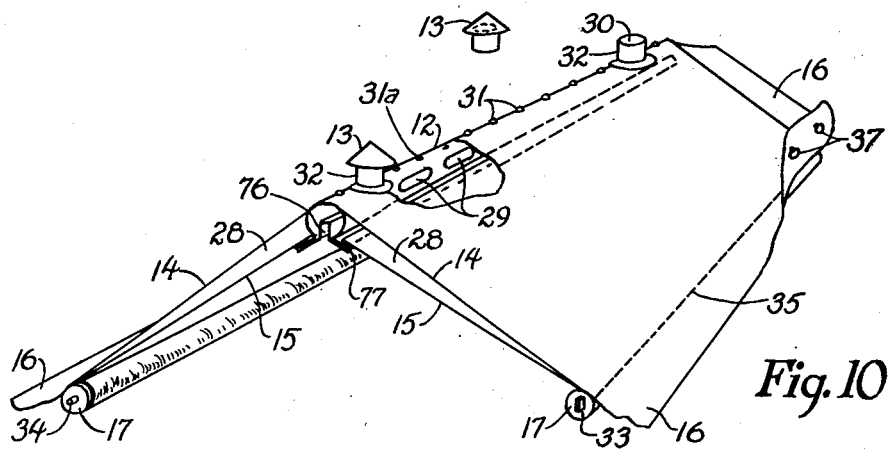
Fig. 10 shows a perspective view of a unit comprising the ridge pole with vent openings and vent hoods, the double canvas top with flaps and automatic spring rollers, one vent hood shown raised off the collar and the rear flap and end closure

These housings are built with upright strips shown by dotted lines 25, Fig. 3 which form an air spaced wall, a strip of sheet metal 26 is folded and, forming an air conductor, is fastened over this air space in wall, and extends to each corner of housing with open ends 27, conducting the warm air from hollow walls to the corners where it escapes past the end of lower canvas top 15 into the air space 28 between canvas. The under canvas top 15 is slightly shorter than the inside measurements of housings leaving an open air passage from living room to air passage 28 in double roof, circulating through opening 29 and through ridge pole 12 to open air. Sheet metal 26 is omitted in the one housing at right side. The top canvas 14 is fastened to ridge pole 12 with a series of large head tap screws 31 screwed into tapped openings 31a. The ferrule 32 serves to make a water tight joint on canvas 14 when vent hood cap 13 is snapped over opening 30 on ferrule 32. One end of each of the spring rollers bearing is made flat as at 33 for a winding key, the opposite end is round as at 34. The tension on spring roller 17 is accomplished by winding flat end 33 before placing in notch 41 where a cotter pin may be placed through hole 41a securing rollers in position. The dotted line 35 indicates a line where the top canvas 14 and the lower canvas 15 are joined together, the lower canvas 15 is fastened around the spring roller 17 and the top canvas 14 is extended past the line 35 to make the flap 16. A cut away portion on canvas 14 gives a view of the ridge pole 12 when this roof section, shown in Fig. 10, is placed in its slidable hangers 39, which is shown in detail in Fig. 14.

Figures 4, 5:
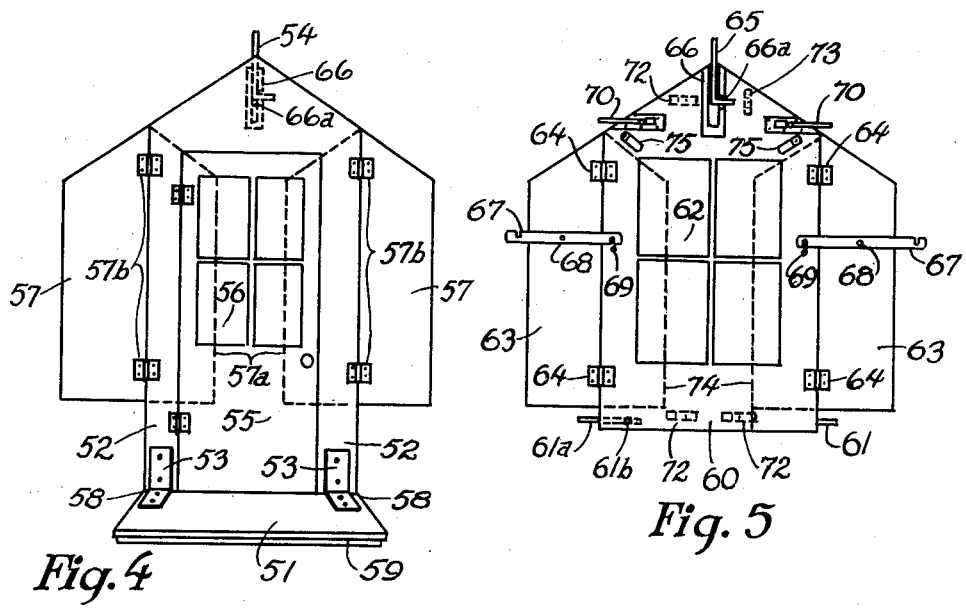
Fig. 5 shows the folding front end wall closure unit or section with windows and auxiliary end doors, the window frame forming the top portion of the gable and carry a slidable guide pin, 65, locking bolts, 70, swinging tie bars, 67 and locking device for the ridge pole.

The canvas roof lies in practically a level position when the housings are in an open position as shown in Fig. 2 ready for raising by the end units, Fig. 4 and 5.

The rabbet 9 Fig. 2, is to receive the lower edge 36a of sides 36 of the housing after which alignment bolts are inserted at 11 thus forming a friction tight joint from end to end of the top corner of the hollow beams and housings. The slidable hanger 39 is a unit shown in enlarged form in Fig. 14 and consists of a flat sliding hanger 40, a notch 41 to receive the end bearings 33 and 34 of automatic spring rollers 17, a handle 42, a spring 43 riveted to hanger 40, a frame 44 in which the flat sliding hanger 40 slides. The frame 44, has two notches 45 and 46a into which the bent end of spring 43 snaps and locks the sliding hanger 40 to a raised position, as shown in Fig. 14, shifts the top of the spring roller 17 on a level with the top of the gables 23 and 23a in order to stretch the canvas flap over these gables. To close the housings Fig. 3 the end of spring 43 is lifted out of notch 45, the hanger 40 sliding down until the end of spring 43 snaps in notch 46a thus shifting or lowering spring rollers 17 within the housings and in a position to receive the canvas as it rolls up as the housings are brought to a closed position. The canvas is kept taut by the tension on spring rollers. The structure when in a closed position the housing wall 36 forms approximately one half the side of the structure with 47 forming the roof or cover, while in an open position this wall 36 swings to a level of the top of the hollow beam structure and enlarging the seating surface at 7 while the roof or cover section 47 swings to a vertical position forming the upper side walls of the structure and a back for seats at 7, the unit, Fig. 10, forming the roof.

A water tight joint is formed across the top of the closed structure by the metal coverings with one half being bent with an upturned edge as at 48. The opposite half is bent to form an inverted groove as at 49 which closes over top and down sides of up turned edge 48 as a tongue and groove joint. The rear end closure and ridge pole operating section Fig. 4 consists of a combination platform and tail gate 51 pivoted or hinged at 58, a door frame 52 is firmly attached at right angles to the platform 51 by angle braces 53, a slidable guide pin 54 to contact the groove 76 in ridge pole 12, is attached to top of door frame 52 which extends up to, and forms a part of, gable of roof and is designed to swing from a horizontal position to a vertical position to raise and support or to lower the rear end of the ridge pole 12 and double air spaced canvas roof or cover 14 and 15 shown in Fig. 10 and keep the ridge pole 12 in a central position over the floor 4. This is accomplished by the slidable guide pins 54 and frame 66 attached to high point of gable, the pin 54 adapted to enter the groove 76 carrying the ridge pole 12 to an open position or to a closed position. When in an open position the guide pin 54 is shifted and lowered to drop ridge pole level with top of gable. The combination platform and tail gate 51 forms a platform at rear door 55 when open to a horizontal position and when closed forms a tail gate or rear end partial closure. This section carries the main door 55 auxiliary end doors or end closures 57, a tie bar 67a, a window 56, and is pivoted at 58 at floor line 4 with a rabbet 59 across top end of tail gate when in a closed position. The dotted lines 57a represent outline of auxiliary end doors 57 when folded back on hinges 57b.

Figure 8:
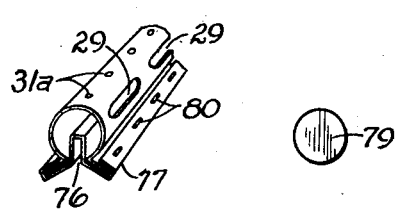
Fig. 8 shows a perspective view of the end of a portion of the ridge pole made up of Figure 6 and Figure 7.

The front end closure and ridge pole operating section Fig. 5 is similar to Fig. 4. This section consists of a window frame 60 pivoted with a stationary pin 61, a slidable pin or bolt 61a with set screw 61b, a window 62, auxiliary end doors 63 hinged at 64, a slidable guide pin 65, a slidable guide pin holder 66 attached to top of window frame 60 which forms a part of front end gable, the frame 60 designed to swing from a horizontal position to a vertical position to carry the weight and to raise or lower the front end of ridge pole 12 and double canvas roof, and support it in an open position. The ridge pole structure shown in Figs. 2, 8 and 10 is guided by slidable guide pin 65 in contact with groove 76 to a central position over the floor 4 when the structure is being closed or opened. This front end section also carries a pair of swing tie bars or locking rods 67 pivoted at 68 which swing and hook over pins 69 Fig. 3 and Fig. 5 tying the end structure firmly to the end sections 50 of the housings. 70 shows sliding bolts which slide into openings at 71 inside of hollow beam see Fig. 2 to lock the front end closures which in turn supports the ridge pole 12 when the roof section is in a position for closing the housings as shown in Fig. 13. The ridge pole 12 being locked to the front end section when in a horizontal position by three permanent hooks 72 on outside of window frame indicated by dotted lines 72 into which the flange 77 of the ridge pole 12 is placed, and oblong button 73 is then turned over flange 77 holding the ridge pole 12 secure to window frame 60 in a horizontal and central position over floor 4 as shown in Fig. 13. Dotted lines 74 represent outline of auxiliary doors 63 when folded back with swing buttons 75 to lock same in position for closing structure. Tie rods similar to 67 shown in Fig. 5 are used on inside of rear end structure Fig. 4.

Figure 6:
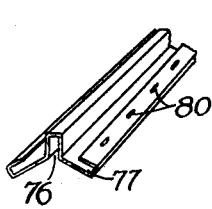
Fig. 6 shows a perspective view of the end of a portion of the lower section of the hollow ridge pole.
Figure 7:
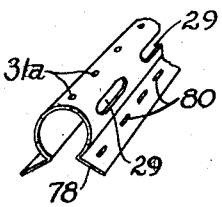
Fig. 7 shows a perspective view of the end of a portion of the top or main section of the ridge pole.
Figure 9:
Fig. 9 is a closure cap for end of ridge pole and acts as an end stop for the slidable guide pin when structure is opened.

Figs. 6 and 7 show construction of the two members of the hollow ridge pole 12, Fig. 8 shows these two members clamped together making the end portion of the complete hollow ridge pole "less end closure cap 79" shown in Fig. 9. 76 is the inverted groove running the entire length of the ridge pole 12 in which the slidable guide pins 54 and 65 slide to guide and to raise the ridge pole 12 and double roof unit shown in Fig. 10 to topmost position over gables. Perforations 80 along the flange portion 77 and 78 serves to lace or fasten the under canvas 15 to the flange 77. Spring hooks 81 are arranged around the top of the structure to which the flaps 16 are hooked. A rear bumper 82 is secured under rear end of frame and acts as a support for the platform 51 when in an open position. 83 shows handles to pull open the housings Fig. 3. 84 shows a pointed shell construction to stream line front end. 85 shows the tow bar and coupling to attach to rear of automobile. 86 is a double two way brace with adjustable arm 87 and adjustable leg 88. Figs. 2 and 13 serve best to show the opening and closing action. Sectional view Fig. 13 shows a closed position of all parts, to open the structure, swing the housings shown in Fig. 3 to an open position as shown in Fig. 2, turn button 73 a quarter turn, slip ridge pole 12 out of fixed or permanent hooks 72, the spring rollers 17 will then take up the slack in canvas top 14 and 15 bringing the roof canvas to a position shown in Fig. 2, then raise the slidable hangers 39 shifting the spring rollers up to a level with gables.

Figure 11:
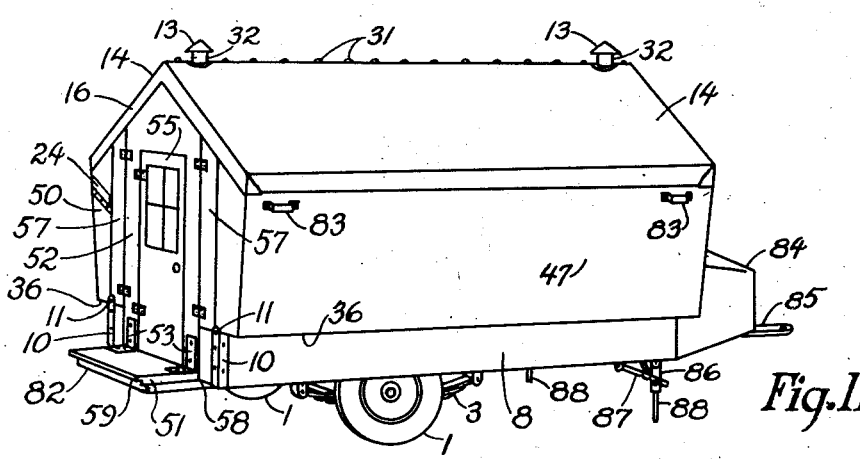
Fig. 11 shows a perspective view of a complete folding camp trailer in an open position.

The sliding bolts 70 are then drawn and the front end unit swings up until pin 65 enters groove 76 in ridge pole 12 then the rear end unit Fig. 4 swings up until pin 54 enters the groove 76 thus, as these two end units Figs. 4 and 5 swing to an open or vertical position, they guide to central position and raise the ridge pole 12 and roof canvas 14 and 15 to an open position above the peak of gable allowing end structures to pass under lower canvas 15; pins 54 and 65 are then turned off of hooks 66a allowing top of ridge pole 12 to drop level with top of peak of gable. Auxiliary doors 57 and 63 are locked into place by locking rods 67 and flaps 16 are then snapped in place. adjustable bracket and leg 86, 87, and 88 are lowered and locked and the trailer is open as shown in Fig. 11.

Having thus described our invention we claim:—

1. In a camp trailer of the character described, boxlike folding housings with air spaced walls for the circulation of air into an air conductor extending to each corner of said housings, said housings forming a portion of the upper side walls, ends, and gables, supported and swinging on a rabbeted friction water tight bearing extending from end to end of said trailer and said housings, pivot bolts to keep said friction joint in alignment, combination wall braces and stop arms to limit swinging movement, said housings adapted to swing to an open position or to a closed position, an upturned edge on top of one housing and an inverted trough or groove on the other housing, said inverted trough or groove adapted to close over said upturned edge, a set of slidable roof roller hangers attached to inside of each housing corner, a set of spring roof rollers, double canvas air spaced ventilating roof members, a hollow ridge pole with inlet venting openings and hooded venting outlet openings on its top, said ridge pole has an inverted groove extending full length along its bottom, flanges extending along the bottom of said ridge pole at each side of said inverted groove, said hollow ridge pole having closed ends, means for attaching top canvas to top of ridge pole and lower canvas to flanges on ridge pole and the canvas on the spring rollers, a combination platform and tail gate with a rabbeted shelf along its outer top edge, a door frame rigidly attached at right angles to said platform, an entrance door and window hinged within said frame, auxiliary end closures hinged to outer side of said door frame, said door frame extending up to form a portion of the gable, a frame with slidable guide pin attached to topmost portion of door frame, said sliding guide pin contacting the inverted groove on said hollow ridge pole, means for shifting the ridge pole above top of gables or below top of gables, a combination front end unit comprising a window frame, a window, and auxiliary front end door closure, a slidable guide pin attached to top of said window frame and adapted to contact the groove in the ridge pole and raise and lower the front end of roof unit, said window frame resting and swinging on a rabbeted shelf across the top of box of trailer, pivot alignment bolts at each end thereof, said window frames adapted to swing from a vertical position to a horizontal central position over the floor, said front end unit when in a horizontal position supporting the ridge pole in a position for the closing of boxlike roof housings, means for locking said front end unit in a horizontal position and means for locking ridge pole on said window frame substantially as described.

2. In combination with a trailer of the conventional type, a hollow ventilating ridge pole having inlet openings along its sides and outlet venting hoods on its top, said ridge pole supporting a double canvas air spaced ventilating roof unit, a pair of automatic spring roof roller hangers, a two part boxlike roof unit housing to carry and spread said double roof units over the trailer, folding end units for raising said roof units to the top of gables and lowering same to close the trailer, said roof roller hangers adapted to shift said roof rollers from a position within the boxlike housings to a position slightly outside of, and on a line with the gables, said boxlike housing resting and swinging in a water tight friction bearing formed by a rabbeted shelf full length of a hollow beam section, pivot bolts at each end of said friction bearing to hold bearing in alignment, said boxlike housings when in a closed position forming a water tight joint by an upturned edge across the center of one cover and an inverted groove across the other cover, to close over the upturned edge on the first named cover, means for locking said end units to end walls of said housings, and means for winding said roof rollers.

3. In a camp trailer of the character described, hollow beam members with rabbeted shelf extending along their top edge from end to end of said hollow beam members supporting a pair of removable boxlike roof housings which form a part of side walls and a portion of end walls when in an open position and a portion of side walls, end walls, and the roof cover when in a closed position, said roof housings adapted to rest and to swing on a water tight friction bearing hinge, a pivot bolt at each end of said rabbeted bearing to keep said bearing in alignment, said roof housings carrying a double air spaced roof unit comprising a hollow ridge pole having inlet venting openings along the sides with hooded vent openings on its top, a double air spaced roof, a pair of spring roof rollers, said roof unit adapted to spread over the trailer by the outward swinging movement of said housings carrying the roof units to an open position, combination brackets and stop arms to limit the opening of each roof housing to approximately a ninety degree movement, a rear end unit comprising a combination tail gate and rear platform, an entrance door frame firmly attached at right angles to said platform with a door, a window, and auxiliary end closure doors hinged to said door frame, a slidable guide pin attached to top of said door frame adapted to contact an inverted groove in said ridge pole and raise and lower the rear end of said roof unit, a front end unit comprising a window frame, a window, auxiliary front end closure doors, a slidable guide pin attached to top of said window frame and adapted to contact a groove in said hollow ridge pole and to raise and lower the front end of the roof unit, said window frame hinged to said beam member and adapted to swing from a vertical to a horizontal position to lower and guide the front end of ridge pole to a central position over the floor and to support and hold said ridge pole in a central position for the closing operation, means for locking the front end unit to the beam member in a horizontal or closing position and means for locking ridge pole to front end unit for closing, one of said housings having an upturned edge across center edge, the other housing having an inverted groove across center edge adapted to close over the said upturned edge of the first named housing to form a water tight joint when housings are in a closed position, means for tying said end units to end wall of said housings and means for winding said spring and operating said spring rollers.

4. In combination with a trailer of the character described, a pair of boxlike roof unit housings forming a portion of the upper side and end walls and a portion of gables, said housings supported and swinging on a rabbeted friction water tight bearing extending full length of the housings, pivot bolts to keep said friction bearing in alignment, said housings reinforced by combination wall braces and stop arms, said stop arms limiting the outward swinging movement of said housings, side wall of said housings when in a closed position reverse their position to enlarge seating surface when thrown to an open position, an upturned edge along the top edge of one half of said housing and an inverted groove along the top edge of the other half of said housings adapted to close over the said upturned edge of the first named half forming an inverted tongue and groove water tight joint when in a closed position, said housings carrying a ventilating double roof unit rolled up within and adapted to swing outwardly and spread said double roof unit over the trailer, front and rear end closure units adapted to raise and support the said double roof unit in an open position and to lower and support it in a closed position, means for locking said roof unit to said front end unit in a closed position and means for tying said end wall units to end walls of said housings substantially as described.

5. In combination with a trailer of the character described, hollow beam members, a pair of boxlike swinging roof housings, a hollow venting ridge pole with inverted groove along its under side, flanges extending from end to end on each side of said inverted groove and a double air spaced ventilating roof, a combination front end roof unit elevator and roof support, a ridge pole locking device, slidable guide pins to operate within the inverted groove, and locking bolts attached to the front end closure unit, a window frame pivoted to top edge of said hollow beam members, said window frame extended to form a portion of gable and adapted to swing to a vertical position or to a horizontal position, means for locking said window frame to said beam member in a horizontal position and means for locking said ridge pole to said window frame for a closing position, said window frame when swinging to a vertical position causes said guide pin to contact said inverted groove in said ridge pole raising front end of said roof unit to an open position and supporting it when raised, auxiliary end doors hinged to said window frame, means for locking front end to ends of housings and means to attach double roof to hollow ridge pole.

6. In combination with a trailer of the character described, hollow beam members extending from front to rear end over the ground wheels, a pair of boxlike swinging housings, pivoted to said beam member, a hollow venting ridge pole with inverted groove along its under side, flanges extending from each side of the inverted groove and a double air spaced ventilating roof unit, a combination rear end roof unit elevator, in combination with a rear end closure unit comprising a combination rear platform and tail gate, a door frame rigidly secured at right angles to said combination platform and tail gate, an entrance door hinged to said door frame with a window and auxiliary end doors hinged to said door frame, said door frame extending up to form a portion of rear gable, a slidable guide pin attached to said gable portion on said door frame, the combination platform and tail gate pivoted at floor line and adapted to swing to a vertical position or to a horizontal position, said combination platform and tail gate when swinging to a vertical position lowers the said door frame and sliding guide pin within the trailer box or body, and when swinging to a horizontal position raises the said door frame and sliding guide pin which contacts the said inverted groove in ridge pole raising the rear end roof unit and supporting it in an open position, auxiliary end doors hinged to said door frame adapted to swing open to complete the end closure, means for locking said rear end units to said housings, a rear bumper arranged to support said rear platform in an open position substantially as described.

7. In combination with a trailer of the character described, a double air spaced ventilating roof unit comprising a double air spaced roof member, a pair of automatic spring roof rollers, a hollow ventilating ridge pole with inverted groove on its bottom and flanges to receive lower roof member, said roof unit carried within boxlike housings, said housings swinging on a rabbeted shelf on top side of a hollow beam member forming a continuous water tight swing joint, alignment bolts inserted through corner braces into said housings and adapted to swing open on said friction bearing to spread the said roof unit over the trailer, combination brackets and stop arms to limit opening of said housings, a combination front end wall unit composed of a window frame, a window, a stationary and a slidable pivot bolt, auxiliary end closure doors, slidable locking bolts, swing tie bars and a slidable guide pin or ridge pole elevator, said front end wall unit adapted to swing to a horizontal position and be locked with said slidable locking bolts to said beam member and means for locking said hollow ridge pole to said front end unit in position for closing said housings, a combination rear end unit comprising a rear end wall closure in combination with a rear platform and tail gate, a door frame secured at right angles to said platform and forming a portion of the rear end gable, a slidable guide pin to contact said inverted groove in said ridge pole, said rear end unit pivoted at floor line and adapted to fold to a horizontal position for closing, and to a vertical position to elevate the rear end of said ridge pole to an open position and support it in a central position, said combination platform and tail gate forming a tail gate for body when in a closed position and rear platform when in an open position, said hollow ridge pole having inlet openings along its sides between the double roof, means for fastening top roof member over top of said ridge pole and means for adjusting a folding leg for trailer support.

RUFUS S. ALLEN.
BEN OAKES.